United States Patent [19]

Goedken et al.

[11] Patent Number: 5,764,743
[45] Date of Patent: Jun. 9, 1998

[54] METHOD OF CONTROLLING OPERATION OF A MULTI-LINE TELEPHONE APPARATUS

[75] Inventors: James Francis Goedken, Arlington Heights; Thomas Stuart Recht, Glencoe; Michael Henry Pittelkow, Buffalo Grove, all of Ill.

[73] Assignee: Motorola, Inc., Schaumburg, Ill.

[21] Appl. No.: 546,459

[22] Filed: Oct. 20, 1995

[51] Int. Cl.[6] .................................................. H04M 1/00
[52] U.S. Cl. .......................... 379/156; 379/158; 379/165; 379/202; 379/205; 379/206
[58] Field of Search .................................... 379/158–159, 379/156, 160, 165, 202–206, 201, 215

[56] References Cited

U.S. PATENT DOCUMENTS

| | | |
|---|---|---|
| 4,203,011 | 5/1980 | Coviello .................................. 379/159 |
| 4,490,583 | 12/1984 | Bednarz et al. . |
| 4,817,132 | 3/1989 | Chamberlain et al. . |
| 5,544,237 | 8/1996 | Bales et al. ............................. 379/201 |

*Primary Examiner*—Curtis A. Kuntz
*Assistant Examiner*—Duc Nguyen
*Attorney, Agent, or Firm*—John J. Oskorep

[57] ABSTRACT

A method of operating a multi-line telephone apparatus includes, when a phone line switch (140) is actuated, taking a phone line off-hook when the line is on-hook and bringing the phone line on-hook when the line is off-hook. When the phone line is off-hook and a hold switch (164) is actuated, a hold condition is placed on the phone line when the line is not on hold and removed when the line is on hold. When a phone call is established on a first phone line and a conference switch (160) is actuated, a second phone line is brought off-hook and a conference call connection is established. A common conventional method of making a conference call, which includes actuations of hold switch (164) and phone line switches (140, 142), is retained.

28 Claims, 5 Drawing Sheets

METHOD OF CONTROLLING OPERATION OF A MULTI-LINE TELEPHONE APPARATUS

FIELD OF THE INVENTION

The present invention relates generally to a method of operating a communication device, and more particularly to a method of operating a multi-line telephone apparatus.

BACKGROUND OF THE INVENTION

Phone line circuitry in a telephone apparatus connects to a central office in a telephone network (or other switching system such as a local PBX) via a land line comprising a pair of conductors historically referred to as a tip and ring pair. Equipment of the central office supplies an operating line voltage, typically a nominal −48 or −24 volts, across the tip and ring. When a receiver of the telephone apparatus is taken "off-hook" by a user who is about to place a phone call, the telephone apparatus connects an impedance between the tip and ring, and thereby establishes a loop which alters the operating line voltage. When the receiver is returned to the "on-hook" state, the loop is eliminated. Since many telephone apparatuses have provided different means for connecting and disconnecting such loops with land lines (e.g., pressing a phone line switch, opening a cover element, etc.), a phone line in the telephone apparatus is considered off-hook when a loop is established with circuitry of the phone line, and on-hook when not.

When the phone line is taken off-hook initially, a dial tone from the central office is heard through a speaker of the telephone apparatus. At this time, a phone call may be placed. Alternatively, when a phone call is waiting for the telephone apparatus, the central office will vary the potential between the tip and ring in a periodic fashion, generating a ringing condition on the phone line. The ringing condition is detected in the telephone apparatus, which then typically generates an audible and/or visual signal to indicate that a phone call is being received. The user may answer the phone call by taking the phone line off-hook.

Useful features are typically provided in the telephone apparatus. For example, the telephone apparatus may allow the user to put the phone line on "hold" during a phone call. When the phone line is placed on hold, the telephone apparatus mutes any audible communication between the user and a party on the phone line while maintaining the connection with the land line. When a hold condition is removed from the phone line (i.e. the phone line is no longer on hold), the audible communication is reestablished. Another feature, "conference calling," is often provided in a multi-line telephone apparatus having at least a first phone line and a second phone line. A conference call typically provides a communications connection (or conference call connection) between three parties: the user of the multi-line telephone apparatus, a first party on the first phone line, and a second party on the second phone line. Each party can communicate to all other parties during the conference call connection.

The multi-line telephone apparatus may also include a user interface having a plurality of keys for operation, each key having a designated function. A LINE 1 key typically functions to take the first phone line off-hook, and a LINE 2 key typically functions to take the second phone line off-hook. An OFF key typically functions to bring the first and second phone lines back on-hook if previously off-hook. A HOLD key typically functions to put the first or second phone line on hold, where the LINE 1 key and LINE 2 key function to remove a hold condition on a phone line. Finally, a CONFERENCE key typically functions to help connect a conference call.

Methods required to operate the multi-line telephone apparatus using the plurality of keys are usually provided in an instruction manual. To place a conference call, for example, most conventional methods require a sequence of steps using the HOLD key, the LINE 1 and LINE 2 keys, and the CONFERENCE key. If a phone call to a first party is established on the first phone line, and it is desired to connect a second party to the conversation using a conventional method, the HOLD key must be pressed to put the first phone line on hold. The second phone line then must be taken off-hook by pressing the LINE 2 key. Dial tone on the second phone line is heard, and a telephone number of the second party is dialed. Finally, once the phone call connects the user with the second party, the conference call is established by pressing the CONFERENCE key.

Since many keys are provided in a user interface of a two-line telephone apparatus, operation of a conventional two-line telephone apparatus may be difficult and confusing. Furthermore, conventional methods provided for the operation are limiting and non-intuitive, especially methods provided for placing a conference call. There is a resulting need for a simplified user interface and a flexible method for operating a multi-line telephone apparatus.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction the accompanying drawings, in the several figures of which like reference numerals identify identical elements, and wherein:

DESCRIPTION OF THE PREFERRED EMBODIMENT

In accordance with the present invention, a method of operating a multi-line telephone apparatus includes, when a phone line switch is actuated, taking a phone line off-hook when the line is on-hook and bringing the phone line on-hook when the line is off-hook. When the phone line is off-hook and a hold switch is actuated, a hold condition is placed on the phone line when the line is not on hold and removed when the line is on hold. When a phone call is established on a first phone line and a conference switch is actuated, a second phone line is brought off-hook and a conference call connection is established. A common conventional method of making a conference call, which includes actuations of hold and phone line switches, is retained.

Figure 1:
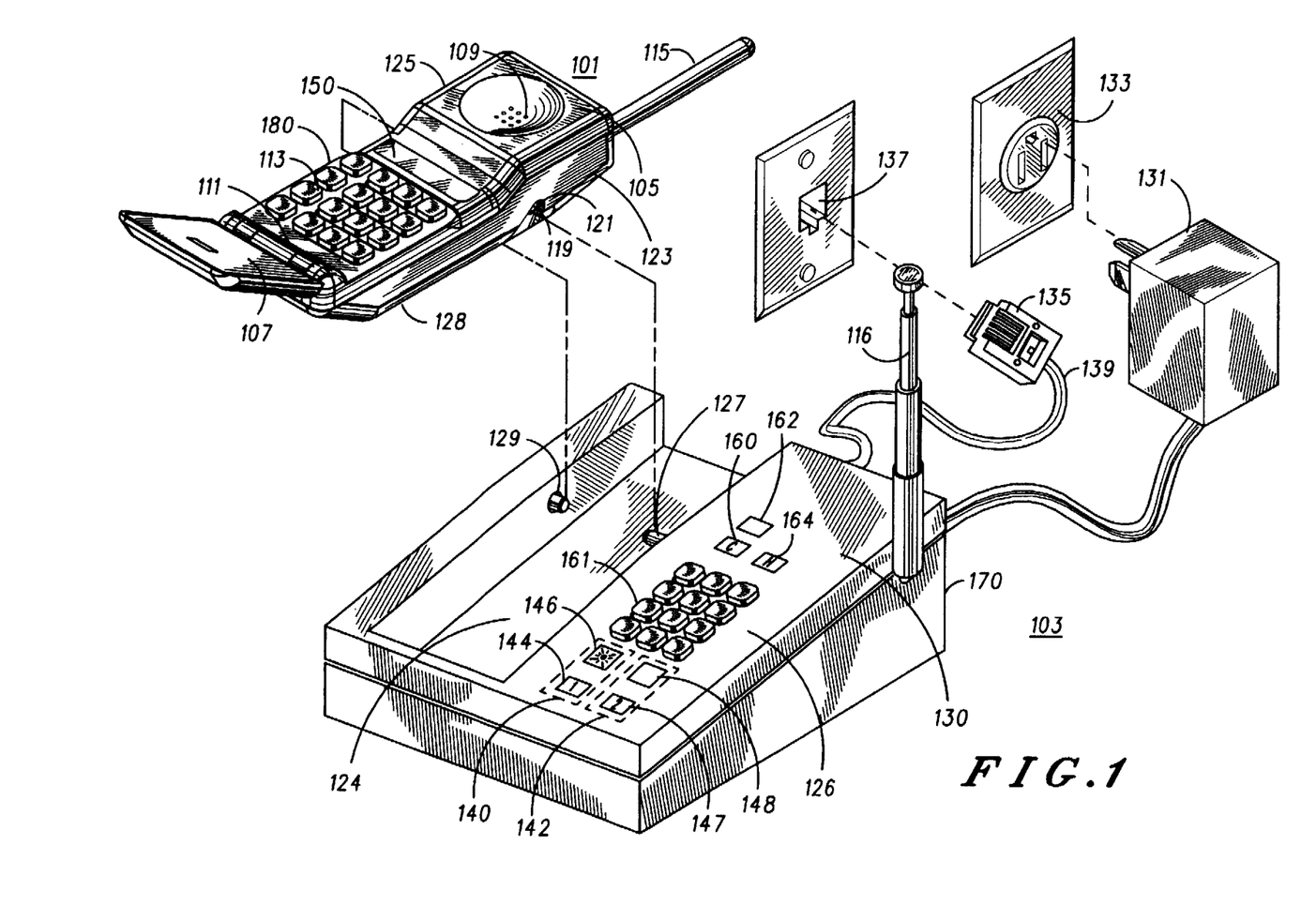
FIG. 1 is an illustration of a telephone apparatus which employs the present invention.

Referring to FIG. 1, a telephone apparatus comprising a handset 101 and base station 103 is shown. Handset 101 consists of two external portions, a body portion 105 and a cover element 107. The drawing of FIG. 1 shows cover element 107 in an "open" position such that the user of handset 101 may listen via an earpiece 109 and may speak into a microphone 111. A handset user interface 180 comprises a handset keypad 113 and a handset display 150. Handset keypad 113 comprises conventional keys and has additional function keys such as channel select and volume control buttons. Handset display 150 is optional and provides illuminated messages including confirmation of most conventional key presses. Although handset 101 as shown is a cordless handset, handset 101 could be a corded handset.

Base station 103 optionally includes a base station user interface 126, comprising a base station conventional keypad 161, a first line interface 140 and a second line interface 142. The first line interface 140 comprises a LINE 1 key 144 and a LINE 1 display 146, and the second line interface 142 comprises a LINE 2 key 147 and a LINE 2 display 148. Base station conventional keypad 161 further includes function keys comprising a CONFERENCE key 160, an OFF key 162, and a HOLD key 164. LINE 1 key 144 is a first phone line switch which can bring a first phone line off-hook for operating use when depressed. Likewise, LINE 2 key 147 is a second phone line switch which can bring a second phone line off-hook for operating use. The LINE 1 display 146 and LINE 2 display 148 provide indications corresponding to conditions or activity occurring on the phone lines. RF communication is provided between base station 103 and handset 101 through a base station antenna 116 and a handset antenna 115.

Figure 2:
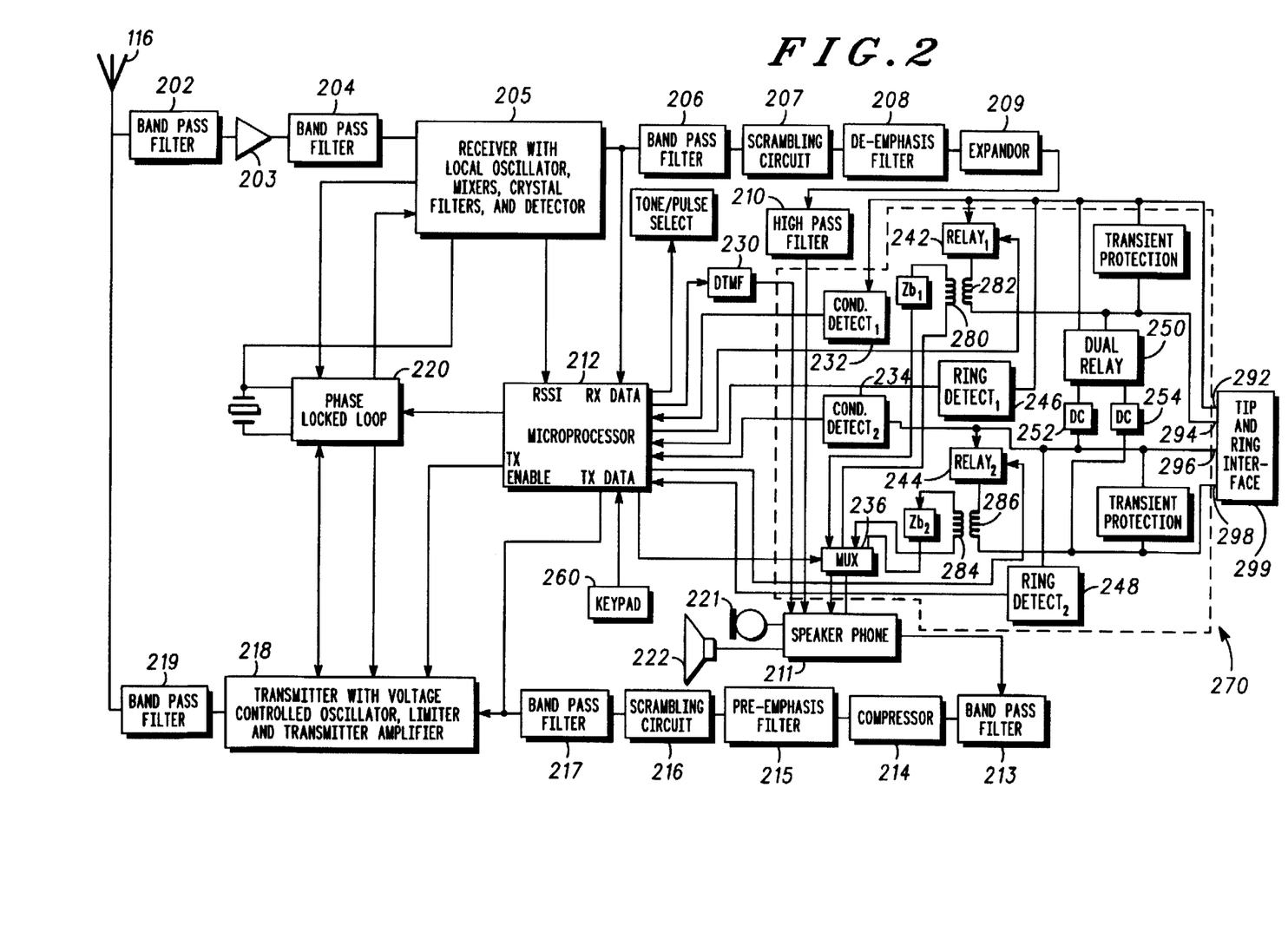
FIG. 2 is a schematic diagram of a base station 103 of the telephone apparatus of FIG. 1.

Referring to FIG. 2, an exemplary base station circuit incorporating the present invention is shown. Base station 103 is comprised of base station antenna 116 that is coupled to receive and transmit paths of base station 103. The receive path is comprised of a first bandpass filter 202 that allows the frequencies of 49.670–49.990 MHz to pass. First bandpass filter 202 is connected to a receive amplifier 203 that amplifies the filtered signal by approximately 18 dB. The output of receive amplifier 203 is then filtered by a second bandpass filter 204 before being input to a receiver 205. In the preferred embodiment, receiver 205 is an MC3363 available from Motorola, Inc.

Receiver 205 mixes the signal down to 10.7 MHz and then to 455 kHz. This signal is then demodulated. The local oscillators in receiver 205 are controlled by a phase locked loop 220 whose frequency is controlled by a microprocessor 212. Microprocessor 212 also receives a carrier detect signal and the demodulated signal from receiver 205. The demodulated signal is used by microprocessor 212 to interpret coded data messages transmitted by the remote unit. These coded data messages are used for DTMF dialing, telephone hook switch control, and control of the scrambling circuit. The carrier detect signal is used to detect the presence of a transmitter occupying the base unit receive channel. In the preferred embodiment, microprocessor 212 is an MC68HC05C9A available from Motorola, Inc.

The output of receiver 205 is filtered again by a third bandpass filter 206. The output of third bandpass filter 206 is input to a first scrambling circuit 207. In the preferred embodiment, first scrambling circuit 207 is an MX108DW Full-Duplex Voiceband Scrambler integrated circuit available from MX.Com, Inc.

The unscrambled output of first scrambling circuit 207 is filtered in a de-emphasis filter 208 before being input to an expander 209. The expansion process applies gain to the input signal that is varied as a function of the signal magnitude, the effective gain being greater for large magnitude signals and less for small magnitude signals. After this signal has been filtered by a highpass filter 210, it is input to a speakerphone circuit 211. If a speakerphone mode is active in base unit 103, speakerphone circuit 211 provides the signal as an output to a speaker 222 of speakerphone circuit 211.

The transmit path of base unit 103 is comprised of audio signals from a microphone 221 of speakerphone circuit 211 and phone line circuitry 270, signals which are filtered through a fourth bandpass filter 213 before going through a compressor 214. Compressor 214 applies gain to the audio signals that are varied as a function of the signal magnitude, the effective gain being greater for small signals. An example of a compandor (compressor/expander) is MC33110 manufactured by Motorola, Inc. The dynamic range of the compandor is 80 dB.

The output of compressor 214 is input to a pre-emphasis filter 215 before being scrambled by a second scrambling circuit 216. Second scrambling circuit 216 is the second half of the same integrated circuit used to unscramble the received signal. The scrambled audio signal is filtered by a fifth bandpass filter 217 before being modulated by the transmitter 218 to a frequency in the range of 46.610–46.970 MHz. The actual frequency used by the telephone apparatus can be user selectable by a switch or other control (not shown) on base unit 103 or handset 101. Both the receive and transmit frequency ranges are set by the Federal Communications Commission (FCC) for all cordless radiotelephone apparatuses. An example of a transmitter is MC2833, manufactured by Motorola, Inc. The output of transmitter 218 is filtered by a fifth bandpass filter 219 to filter out the signal outside the 46.610–46.970 MHz range. This signal is then transmitted from base station antenna 116 to handset antenna 115.

Base station 103 comprises phone line circuitry 270 providing for the first phone line and the second phone line, each phone line providing a separate channel for communication. Phone line circuitry 270 of base station 103 is coupled to land lines from the central office through phone jack arrangement 299. Tip and ring lines 292, 294, respectively, of the first phone line may be coupled to tip and ring lines of a first land line from the central office through phone jack arrangement 299. Likewise, tip and ring lines 296, 298, respectively, of the second phone line may be coupled to tip and ring lines of a second land line from the central office through phone jack arrangement 299.

The following description assumes that phone line circuitry 270 is coupled to both the first and second land lines. For the first phone line, tip line 292 is coupled to a first relay 242 which is coupled to one end of a first inductor 282, and ring line 294 is coupled to another end of first inductor 282. When the first phone line is taken off-hook by the user, microprocessor 212 controls first relay 242 to couple tip line 292 to first inductor 282, establishing an electrical loop or connection with the first land line. Since first inductor 282 is magnetically coupled to a second inductor 280, signals from the first land line are input to a multiplexer 236 when the loop is established. Microprocessor 212 controls multiplexer 236 to output these signals to fourth bandpass filter 213 for transmission and also to speaker 222 when speakerphone mode is active. At the same time, microprocessor 212 controls multiplexer 236 to feed the signals from highpass filter 210 and microphone 221 of speakerphone circuit 211 (when speakerphone mode is active) to second inductor 280, where, through the magnetic coupling of first inductor 282, the signals reach the first land line. Thus, a duplex communications connection may be established between the user of the first phone line and the first party on the first land line.

For the second phone line, tip line 296 is coupled to a second relay 244 which is coupled to one end of a third inductor 286, and ring line 298 is coupled to another end of third inductor 286. When the second phone line is taken off-hook by the user, microprocessor 212 controls second relay 244 to couple tip line 296 to third inductor 286, establishing an electrical loop or connection with the second land line. Since third inductor 286 is magnetically coupled to a fourth inductor 284, signals from the second land line are input to multiplexer 236 when the loop is established. Microprocessor 212 controls multiplexer 236 to output these signals to fourth bandpass filter 213 for transmission and also to speaker 222 when speakerphone mode is active. At the same time, microprocessor 212 controls multiplexer 236 to feed the signals from highpass filter 210 and microphone 221 of speakerphone circuit 211 (when speakerphone mode is active) to fourth inductor 284, where, through the magnetic coupling to third inductor 286, the signals reach the second land line. Thus, a duplex communications connection may be established between the user of the second phone line and the second party on the second land line.

Several other types of communications connections may be made using the telephone apparatus. A three-way connection between a user of handset 101, a user of base station 103, and a party on one of the phone lines can be established. Also, a conference call connection, as described above, may be made. During a conference call connection, microprocessor 212 controls first and second relays 242, 244 to maintain connections to both the first and second phone lines, a dual relay 250 to couple the first and second phone lines together, and multiplexer 236 to output signals from both phone lines to speakerphone circuit 211. The conference call connection may be a four-way connection including the user of handset 101, the user of base station 103, a party on the first phone line, and a party on the second phone line. The phone lines may also be used separately by the users of handset 101 and base station 103. For example, handset 101 may have a first phone call on the first phone line while base station 103 has a second phone call on the second phone line. In this situation, microprocessor 212 controls dual relay 250 to decouple the first and second phone lines.

Tip line 292 is also coupled to a first ring detector 246 which signals microprocessor 212 when a ringing condition exists on the first phone line. Likewise, tip line 296 is coupled to a second ring detector 248 which signals microprocessor 212 when a ringing condition exists on the second phone line. Microprocessor 212 may alert the user with audible and/or visual signals when the ringing condition exists on one of the phone lines. Tip line 292 is also coupled to a first condition detector 232 which signals microprocessor 212 when a predetermined condition exists on the first phone line. Likewise, tip line 296 is coupled to a second condition detector 234 which signals microprocessor 212 when the predetermined condition exists on the second phone line.

Figure 3:
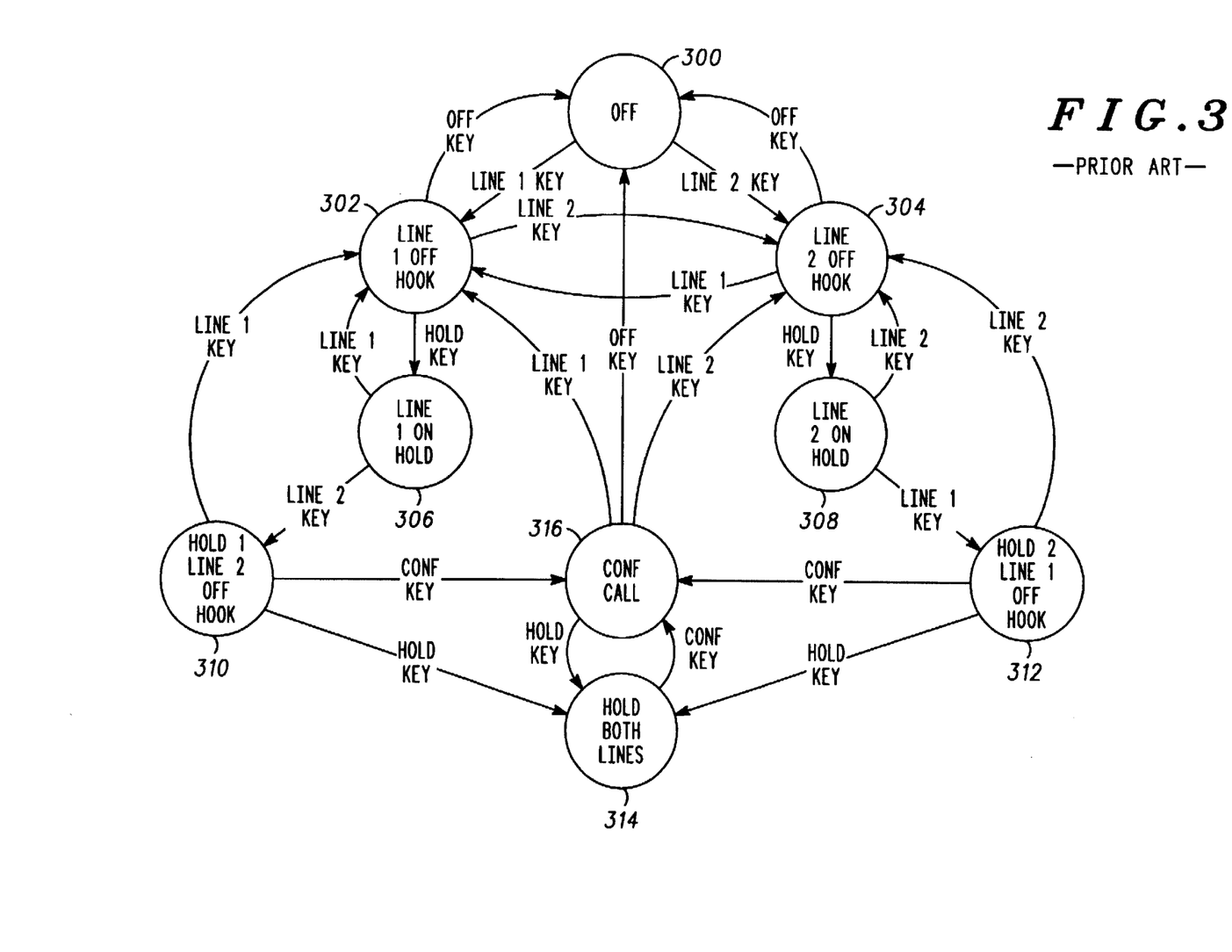
FIG. 3 is a state transition diagram illustrating a conventional method of operating a telephone apparatus.

FIG. 3 is a state transition diagram showing a conventional method of operating a multi-line telephone apparatus. State descriptions follow. State 300 includes the conditions where the first phone line and the second phone line are both on-hook. State 302 includes the conditions where the first phone line is off-hook and the second line is on-hook. State 304 includes the conditions where the second line is off-hook and the first line is on-hook. State 306 includes the conditions where the first phone line is off-hook and on hold, and the second phone line is on-hook. State 308 includes the conditions where the second phone line is off-hook and on hold, and the first phone line is on-hook. State 310 includes the conditions where the first phone line is off-hook and on hold, and the second phone line is off-hook. State 312 includes the conditions where the second phone line is off-hook and on hold, and the first phone line is off-hook. State 314 includes the conditions where both phone lines are off-hook and on hold. State 316 includes the conditions where both phone lines are off-hook and included in a conference call connection.

FIG. 3 state transitions follow. From state 300, state 302 is entered by depression of LINE 1 key 144, and state 304 is entered by depression of LINE 2 key 147. From state 302, state 300 is entered by depression of OFF key 162, state 304 is entered by depression of LINE 2 key 147, and state 306 is entered by depression of HOLD key 164. From state 304, state 300 is entered by depression of OFF key 162, state 302 is entered by depression of LINE 1 key 144, and state 308 is entered by depression of HOLD key 164. From state 306, state 302 is entered by depression of LINE 1 key 144, and state 310 is entered by depression of LINE 2 key 147. From state 308, state 304 is entered by depression of LINE 2 key 147, and state 312 is entered by depression of LINE 1 key 144. From state 310, state 302 is entered by depression of LINE 1 key 144, state 314 is entered by depression of HOLD key 164, and state 316 is entered by depression of CONFERENCE key 160. From state 312, state 304 is entered by depression of LINE 2 key 147, state 314 is entered by depression of HOLD key 164, and state 316 is entered by depression of CONFERENCE key 160. From state 316, state 300 is entered by depression of OFF key 162, state 302 is entered by depression of LINE 1 key 144, state 304 is entered by depression of LINE 2 key 147, and state 314 is entered by depression of HOLD key 164. From state 314, state 316 is entered by depression of CONFERENCE key 160.

According to FIG. 3, the user may place and terminate a phone call in the following manner. Starting at state 300, LINE 1 key 144 is depressed and state 302 is entered where the first phone line is off-hook. In state 302, the user will hear a dial tone from the first phone line and is able to make a first phone call to a first party. When the user is finished with the call, OFF key 162 is depressed and state 300 is entered where the first phone line is brought back on-hook. If the user wishes to place the first party on hold during the first phone call from state 302, HOLD key 164 is depressed and state 306 is entered where the first phone line is on hold. To remove the hold condition on the first phone line, LINE 1 key 144 is depressed and state 302 is reentered, where the user and the first party may continue conversation.

If the user wishes to place a second phone call on the second phone line from state 306, where the first phone line is on hold, LINE 2 key 310 is depressed and state 310 is entered where the second phone line is off-hook. In state 310, the user will hear a dial tone from the second phone line and is able to make a second phone call to a second party while the first phone line remains on hold. After establishing the second phone call, the user may wish to talk privately to the first party again while maintaining the connection with the second party. In this situation, the user often depresses LINE 1 key 144 and state 302 is entered, where the hold condition is removed from the first phone line, but the second phone line is inadvertently dropped.

Given the methods in FIG. 3, the user may place a conference call in the following manner. Starting at state 300, LINE 1 key 144 is depressed and state 302 is entered where the first phone line is off-hook. In state 302, the user will hear the dial tone from the first phone line and is able to make the first phone call to the first party. Once the first phone call is established, HOLD key 164 is depressed and state 306 is entered, where the first phone line is on hold. In state 306, since the first phone line is on hold, the first party can no longer hear the user or the user's communications. From state 306, LINE 2 key 147 is depressed and state 310 is entered, where the first phone line is still on hold but the second phone line is off-hook. In state 310, the user will hear the dial tone of the second phone line and is able to make a second phone call to a second party. Once the second phone call is established, CONFERENCE key 160 is depressed and state 316 is entered, where the hold condition on the first phone line is removed and the conference call is established. In this state, there is a conference call connection between the user, the first party on the first phone line, and the second party on the second phone line.

Conventional methods for operating a telephone apparatus may pose many difficulties to a user. First, the user is forced to frequently "hop" keys when bringing a phone line on-hook and off-hook. This is also true when the user puts a phone line on hold and subsequently wishes to remove the hold condition. Also, methods for connecting a conference call require a user to press several keys in a strict sequence. Finally, a user may not want to be cut off from audible communications with a party when forced to put a phone line on hold prior to making a conference call connection.

Figure 4:
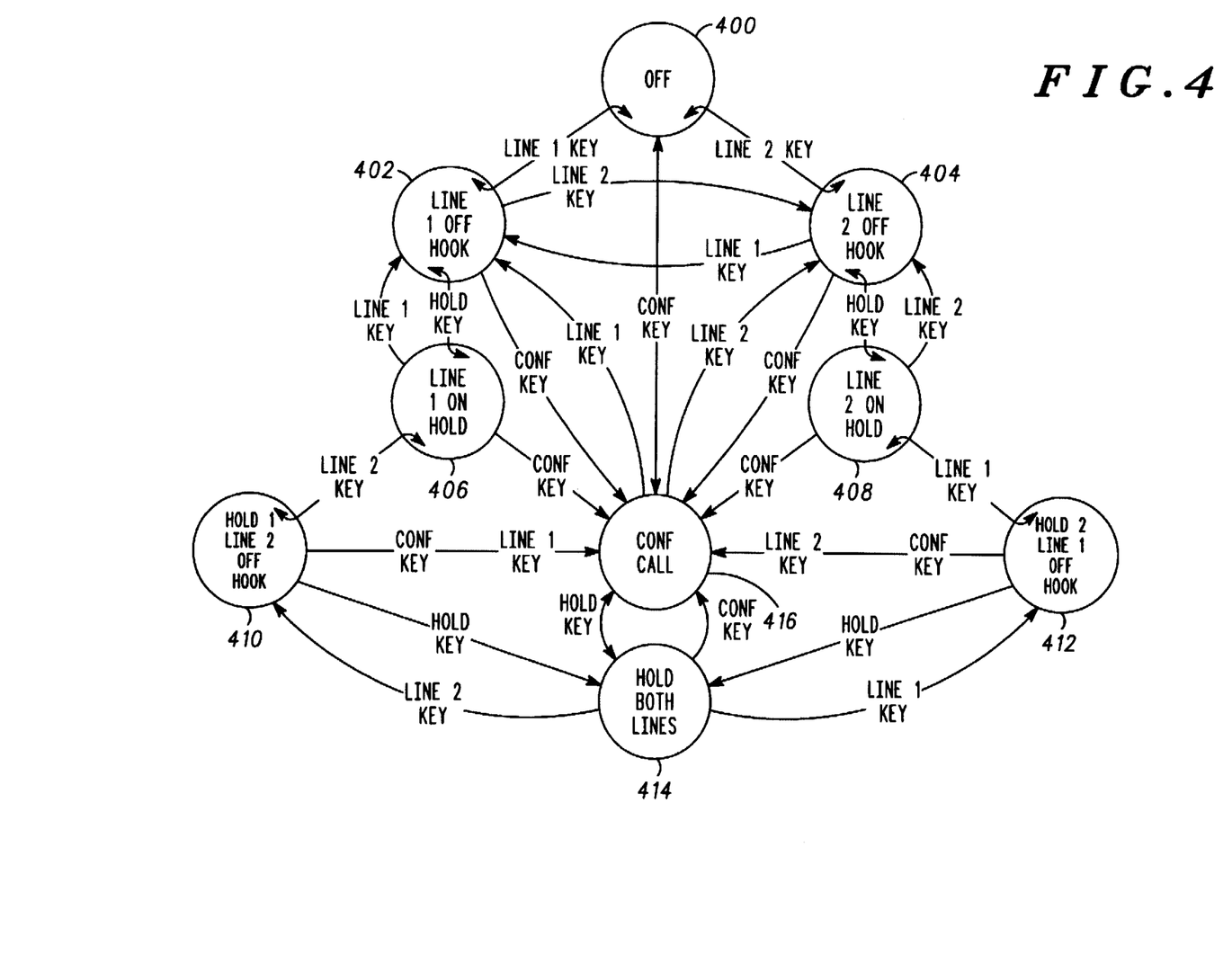
FIG. 4 is a state transition diagram illustrating the operation of the telephone apparatus of FIG. 1 in accordance with the present invention.

FIG. 4 is a state transition diagram showing the operation of the telephone apparatus of FIG. 1 in accordance with the present invention. State descriptions follow. State 400 includes the conditions where the first phone line and the second phone line are both on-hook. State 402 includes the conditions where the first phone line is off-hook and the second line is on-hook. State 404 includes the conditions where the second line is off-hook and the first line is on-hook. State 406 includes the conditions where the first phone line is off-hook and on hold, and the second phone line is on-hook. State 408 includes the conditions where the second phone line is off-hook and on hold, and the first phone line is on-hook. State 410 includes the conditions where the first phone line is off-hook and on hold, and the second phone line is off-hook. State 412 includes the conditions where the second phone line is off-hook and on hold, and the first phone line is off-hook. State 414 includes the conditions where both phone lines are off-hook and on hold. State 416 includes the conditions where both phone lines are off-hook and included in a conference call connection.

FIG. 4 state transitions follow. From state 400, state 402 is entered by depression of LINE 1 key 144, state 404 is entered by depression of LINE 2 key 147, and state 416 is entered by depression of CONFERENCE key 160. From state 402, state 400 is entered by depression of LINE 1 key 144, state 404 is entered by depression of LINE 2 key 147, state 406 is entered by depression of HOLD key 164, and state 416 is entered by depression of CONFERENCE key 160. From state 404, state 400 is entered by depression of LINE 2 key 147, state 402 is entered by depression of LINE 1 key 144, state 408 is entered by depression of HOLD key 164, and state 416 is entered by depression of CONFERENCE key 160. From state 406, state 402 is entered by depression of LINE 1 key 144 or HOLD key 164, state 410 is entered by depression of LINE 2 key 147, and state 416 is entered by depression of CONFERENCE key 160. From state 408, state 404 is entered by depression of LINE 2 key 147 or HOLD key 164, state 412 is entered by depression of LINE 1 key 144, and state 416 is entered by depression of CONFERENCE key 160. From state 410, state 410 is entered by depression of LINE 2 key 147, state 414 is entered by depression of HOLD key 164, and state 416 is entered by depression of CONFERENCE key 160. From state 412, state 408 is entered by depression of LINE 1 key 144, state 414 is entered by depression of HOLD key 164, and state 416 is entered by depression of CONFERENCE key 160. From state 416, state 400 is entered by depression of CONFERENCE key 160, state 402 is entered by depression of LINE 1 key 144, state 404 is entered by depression of LINE 2 key 147, and state 414 is entered by depression of HOLD key 164. From state 414, state 416 is entered by depression of CONFERENCE key 160 or HOLD key 164, state 410 is entered by depression of LINE 2 key 147, and state 412 is entered by depression of LINE 1 key 144.

According to the present invention, the user may place and terminate a phone call in the following manner. Starting at state 400, LINE 1 key 144 is depressed and state 402 is entered where the first phone line is off-hook. In state 402, the user will hear dial tone of the first phone line and is able to make a first phone call to a first party. When the user is finished with the call, LINE 1 key 144 is depressed again and state 400 is entered, where the first phone line is brought back on-hook. The present invention makes no use of OFF key 162, which may be eliminated from the user interface.

The user may make a conference call in the following manner. Starting at state 400, LINE 1 key 144 is depressed and state 402 is entered where the first phone line is off-hook. In state 402, the user will hear the dial tone on the first phone line and is able to make the first phone call to the first party. Once the first phone call is established, CONFERENCE key 160 is depressed and state 416 is entered where there is a conference call connection between the user, the first party on the first phone line, and the second phone line. The user and the first party will hear a dial tone on the second phone line and either party can place a second phone call to a second party. The present invention eliminates two steps in the use of conventional methods: the step of pressing HOLD key 164 and the step of pressing LINE 2 key 147. It also maintains the initial connection between the user and the first party when the user places the second phone call to the second party.

However, the user may desire to maintain some privacy before establishing the conference call with the second party. The present invention can accommodate for this also. Starting at state 400, LINE 1 key 144 is depressed and state 402 is entered where the first phone line is off-hook. In state 402, the user will hear a dial tone of the first phone line and is able to make a first phone call to a first party. Once the first phone call is established, HOLD key 164 is depressed and state 406 is entered, where the first phone line is on hold. In state 406, since the first phone line is on hold, the first party can no longer hear the user or the user's communications. From state 406, CONFERENCE key 160 is depressed and state 416 is entered, where the hold condition on the first phone line is removed and a conference call is established. In state 416, there is a conference call connection between the user, the first party on the first phone line, and the second phone line. In state 410, the user and the first party will hear the dial tone of the second phone line and either party can place the second phone call to the second party. The present invention eliminates one step in the use of conventional methods, the step of pressing LINE 2 key 144 prior to establishing the second phone call to the second party. The second phone line is automatically included in the conference call connection by the depression of CONFERENCE key 160.

The present invention is also accommodating to the user who is accustomed to the use of conventional methods when placing a conference call, or one who wishes to maintain complete privacy with the second party before establishing the conference call. Starting at state 400, LINE 1 key 144 is depressed and state 402 is entered where the first phone line is off-hook. In state 402, the user will hear the dial tone of the first phone line and is able to make the first phone call to the first party. Once the first phone call is established, HOLD key 164 is depressed and state 406 is entered, where the first phone line is on hold. In state 406, since the first phone line is on hold, the first party can no longer hear the user or the user's communications. From state 406, LINE 2 key 147 is depressed and state 410 is entered, where the first phone line is still on hold but the second phone line is off-hook. In state 410, the user will hear the dial tone of the second phone line and either party can place the second phone call to the second party. Once the second phone call is established, CONFERENCE key 160 is depressed and state 416 is entered, where the hold condition on the first phone line is removed and the conference call is established. In state 416, there is a communications connection between the user, the first party, and the second party.

In state 410, the user may just wish to speak with the first party on the first phone line while maintaining the connection with the second party on the second phone line. The user's inclination to depress LINE 1 key 144, as described above, does not drop the second phone call as it does with conventional methods, but establishes a conference call connection between all parties. This conference call feature prevents the user from inadvertently dropping the second phone call.

Figure 5:
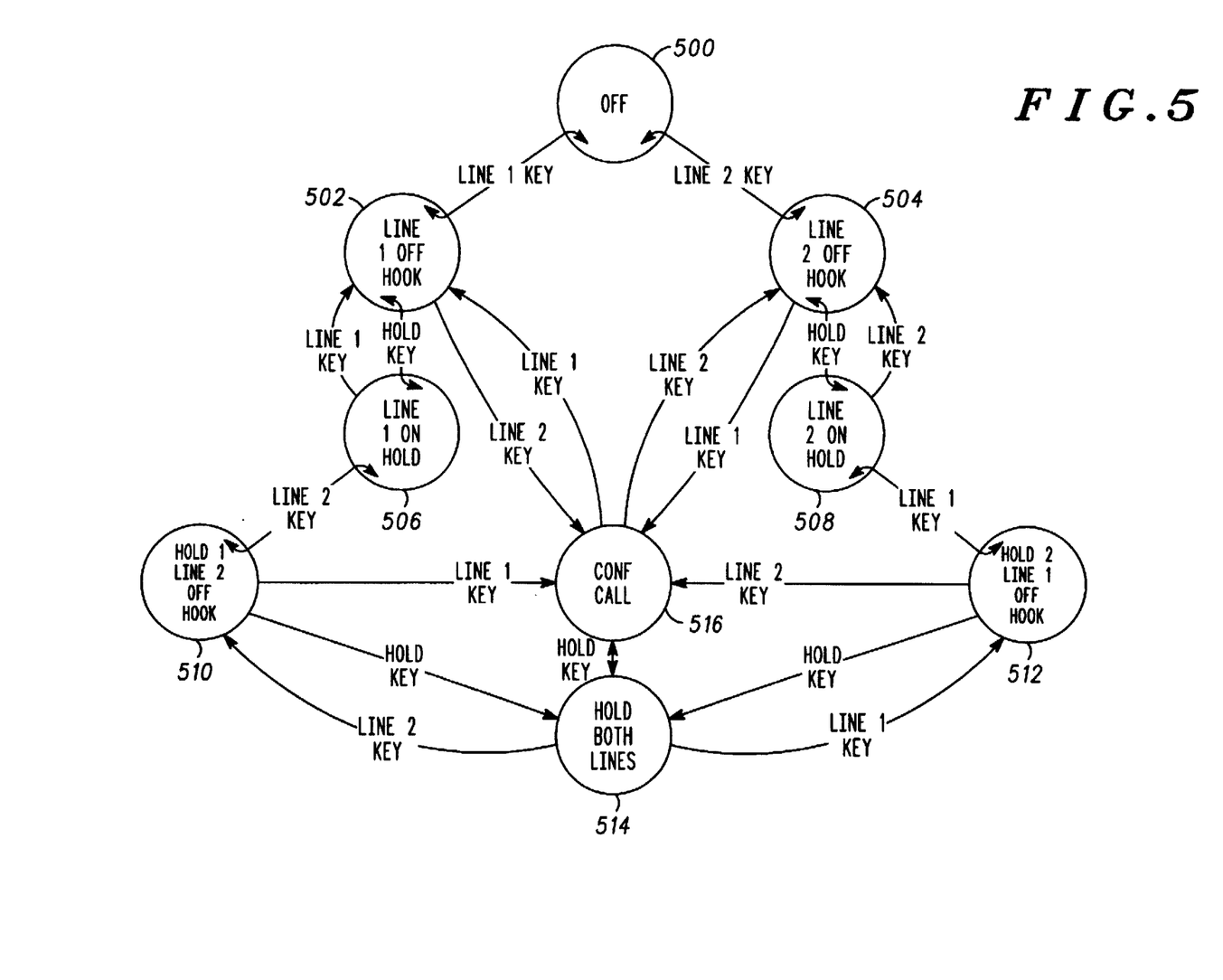
FIG. 5 is a state transition diagram illustrating an alternate embodiment for the operation of the telephone apparatus of FIG. 1 in accordance with the present invention.

In FIG. 5, an alternate embodiment of the present invention eliminating the use of CONFERENCE key 160 as shown in FIG. 4 is illustrated. The user may make a conference call in the following manner. Starting at state 500, LINE 1 key 144 is depressed and state 502 is entered where the first phone line is off-hook. In state 502, the user will hear the dial tone on the first phone line and is able to make the first phone call to the first party. Once the first phone call is established, LINE 2 key 160 is depressed and state 516 is entered where there is a conference call connection between the user, the first party on the first phone line, and the second phone line. The user and the first party will hear a dial tone on the second phone line and either party can place a second phone call to a second party. The remaining transitions are identical to those described earlier in reference to FIG. 4.

Thus, the present invention provides a flexible means for operating a multi-line telephone apparatus, means which are both simple and intuitive. The user no longer is forced to "hop" keys when bringing a phone line off-hook and on-hook or when putting a phone line on hold and subsequently removing the hold condition. Also, a user interface not having OFF key 162 is preferred since a larger number of keys implies an increased complexity of operation which may confuse an average user. Finally, once a phone call is established on a phone line, a conference call connection may be established by simply depressing CONFERENCE key 160 rather than being forced through a series of steps. The conference call connection allows either party to place the second phone call.

While a particular embodiment of the present invention has been shown and described, modifications may be made.

For example, while the depression of a key is used to trigger a function of the multi-line telephone apparatus in the preferred embodiment, an actuation of a switch of any type will work just as well (e.g., an actuation of a LINE 1 switch, an actuation of a LINE 2 switch, an actuation of a HOLD switch, and an actuation of a CONFERENCE switch). Also, location of the keys or switches is not limited to base station 103, but may be placed in handset 101. It is therefore intended in the appended claims to cover all such changes and modifications which fall within the true spirit and scope of the invention.

What is claimed is:

1. A method of controlling operation of a multi-line telephone apparatus, the multi-line telephone apparatus providing for communication on a first phone line and a second phone line, the method comprising the steps of:

(a) detecting an actuation of a conference switch in the multi-line telephone apparatus;

(b) in response to step (a), if the first phone line is on-hook and the second phone line is off-hook, controlling the multi-line telephone apparatus so that the first phone line is brought off-hook and the second phone line remains off-hook and is not put on hold; and (c) in response to step (a), if the second phone line is on-hook and the first phone line is off-hook, controlling the multi-line telephone apparatus so that the second phone line is brought off-hook and the first phone line remains off-hook and is not put on hold.

2. The method according to claim 1, further comprising the steps of:

(d) prior to step (a), detecting actuations of telephone keys in the multi-line telephone apparatus; and (e) in response to step (d), controlling the multi-line telephone apparatus to connect a telephone call on one phone line of the first phone line and the second phone line.

3. The method according to claim 1, further comprising the step of:

(d) establishing a conference call connection that includes the first phone line and the second phone line.

4. The method according to claim 1, further comprising the steps of:

(d) after step (a), detecting a subsequent actuation of the conference switch; and (e) in response to step (d), controlling the multi-line telephone apparatus so that the first phone line and the second phone line are brought on-hook.

5. The method according to claim 1, further comprising the steps of:

(d) prior to step (a), detecting an actuation of a hold switch in the multi-line telephone apparatus;

(e) prior to step (a), detecting a condition where the first phone line is off-hook and not on hold; and in response to step (d) and step (e), controlling the multi-line telephone apparatus so that the first phone line is put on hold.

6. The method according to claim 1, wherein step (c) further includes the step of controlling the multi-line telephone apparatus so that a hold condition on the first phone line is removed and wherein step (b) further includes the step of controlling the multi-line telephone apparatus so that a hold condition on the second phone line is removed.

7. The method according to claim 1, further comprising the steps of:

(d) detecting an actuation of a phone line switch in the multi-line telephone apparatus; and (e) in response to step (d), controlling the multi-line telephone apparatus so that one phone line of the first phone line and the second phone line is brought on-hook.

8. The method according to claim 1, further comprising the steps of:
   (d) after step (a), detecting an actuation of a hold switch in the multi-line telephone apparatus; and
   (e), in response to step (d), controlling the multi-line telephone apparatus so that the first phone line and the second phone line are put on hold.

9. The method according to claim 8, further comprising the steps of:
   (f) after step (d), detecting a subsequent actuation of the hold switch; and
   (g) in response to step (f), removing the hold condition on the first phone line and the second phone line.

10. The method according to claim 8, further comprising the steps of:
    (f) after step (d), detecting a subsequent actuation of the conference switch; and
    (g) in response to step (f), removing the hold conditions on the first phone line and the second phone line.

11. A method of controlling operation of a multi-line telephone apparatus providing for communication on a first line and a second line, said method comprising the steps of:
    (a) detecting a condition where the first line is in use for communication and on hold and the second line is not in use for communication;
    (b) detecting a condition where the first line is not in use for communication and the second line is in use for communication and on hold;
    (c) detecting an actuation of a conference switch in the multi-line telephone apparatus;
    (d) in response to step (a) and step (c), establishing that the second line is enabled for communication use and the first line is no longer on hold;
    (e) in response to step (b) and step (c), establishing that the first line is enabled for communication use and the second phone line is no longer on hold; and
    (f) in response to step (c), establishing a conference call connection that includes the first line and the second line.

12. The method according to claim 11, further comprising the steps of:
    (g) detecting a condition where the first line and the second line are not in use for communication; and
    (h) in response to step (g) and step (c), establishing that the first line and the second line are enabled for communication use.

13. The method according to claim 11, further comprising the steps of:
    (g) detecting a condition where the first line and the second line are in use for communication; and
    (h) in response to step (g) and step (c), establishing that the first line and the second line are disabled from communication use.

14. The method according to claim 11, further comprising the steps of:
    (g) detecting a condition where the first line and the second line are in use for communication;
    (h) detecting an actuation of a first line switch in the multi-line telephone apparatus;
    (i) detecting an actuation of a second line switch in the multi-line telephone apparatus;

(j) in response to step (g) and step (h), establishing that the second line is disabled from communication use; and
(k) in response to step (g) and step (i), establishing that the first line is disabled from communication use.

15. A method of controlling operation of a telephone apparatus, the telephone apparatus including a first line switch, the method comprising the steps of:
    if an actuation of the first line switch is detected when a first phone line of the telephone apparatus is in use for communication, establishing that the first phone line is disabled from communication use;
    if an actuation of the first line switch is detected when the first phone line is not in use for communication, establishing that the first phone line is enabled for communication use; and
    if an actuation of the first line switch is detected when the first phone line is in use for communication and on hold, establishing that the first phone line is no longer on hold.

16. The method according to claim 15, wherein the telephone apparatus includes a second line switch, the method further comprising the steps of:
    if an actuation of the second line switch is detected when a second phone line of the telephone apparatus is in use for communication, establishing that the second phone line is disabled from communication use;
    if an actuation of the second line switch is detected when the second phone line is not in use for communication, establishing that the second phone line is enabled for communication use; and
    if an actuation of the second line switch is detected when the second phone line is in use for communication and on hold, establishing that the second phone line is no longer on hold.

17. A method of controlling operation of a telephone apparatus, the method comprising the steps of:
    (a) detecting an actuation of a hold switch in said telephone apparatus;
    (b) in response to step (a), if a first line of the telephone apparatus is in use for communication and not on hold, establishing that the first line is on hold;
    (c) in response to step (a), if the first line is in use for communication and on hold, establishing that the first line is no longer on hold;
    (d) detecting an actuation of a first line switch in the telephone apparatus; and
    (e) in response to step (d), if the first line is in use for communication and on hold, establishing that the first line is no longer on hold.

18. The method according to claim 17, further comprising the steps of:
    (f) in response to step (d), if the first line is in use for communication and not on hold, establishing that the first line is disabled from use for communication; and
    (g) in response to step (d), if the first line is not in use for communication, establishing that the first line is enabled for use in communication.

19. A method of controlling operation of a multi-line telephone apparatus providing for communication on a first phone line and a second phone line, the method comprising the steps of:
    (a) detecting a condition where the first phone line and the second phone line are on-hook;
    (b) detecting a condition where the first phone line is off-hook and the second phone line is on-hook;

(c) detecting a condition where the first phone line is on-hook and the second phone line is off-hook;

(d) detecting an actuation of a first phone line switch in the multi-line telephone apparatus;

(e) detecting an actuation of a second phone line switch in the multi-line telephone apparatus;

(f) in response to step (a) and step (d), establishing that the first phone line is off-hook;

(g) in response to step (a) and step (e), establishing that the second phone line is off-hook;

(h) in response to step (b) and step (d), establishing that the first phone line is on-hook;

(i) in response to step (b) and step (e), establishing that the first phone line is on-hook and the second phone line is off-hook;

(j) in response to step (c) and step (d), establishing that the first phone line is off-hook and the second phone line is on-hook; and (k) in response to step (c) and step (e), establishing that the second phone line is on-hook.

20. The method according to claim 19, further comprising the steps of:

(l) detecting a condition where the first phone line and the second phone line are off-hook;

(m) in response to step (l) and step (d), establishing that the second phone line is on-hook; and (n) in response to step (1) and step (e), establishing that the first phone line is on-hook.

21. The method according to claim 19, further comprising the steps of:

(l) detecting an actuation of a conference switch in the multi-line telephone apparatus;

(m) in response to step (b) and step (l), establishing that the second phone line is off-hook; and (n) in response to step (c) and step (l), establishing that the first phone line is off-hook.

22. The method according to claim 21, wherein step (m) and step (n) both include the step of establishing a conference call connection that includes the first phone line and the second phone line.

23. The method according to claim 19, further comprising the steps of:

(l) detecting a condition where the first phone line is off-hook and on hold, and the second phone line is on-hook;

(m) detecting a condition where the first phone line is off-hook and on hold, and the second phone line is off-hook;

(n) detecting a condition where the second phone line is off-hook and on hold, and the first phone line is on-hook;

(o) detecting a condition where the second phone line is off-hook and on hold, and the first phone line is off-hook;

(p) detecting a condition where the first phone line and the second phone line are off-hook and on hold;

(q) detecting an actuation of a hold switch in the multi-line telephone apparatus;

(r) in response to step (1) and step (d), establishing that the first phone line is no longer on hold;

(s) in response to step (1) and step (e), establishing that the second phone line is off-hook;

(t) in response to step (1) and step (q), establishing that the first phone line is no longer on hold;

(u) in response to step (m) and step (d), establishing that the first phone line is no longer on hold;

(v) in response to step (m) and step (e), establishing that the second phone line is on-hook;

(w) in response to step (m) and step (q), establishing that the second phone line is on hold;

(x) in response to step (n) and step (d), establishing that the first phone line is off-hook;

(y) in response to step (n) and step (e), establishing that the second phone line is no longer on hold;

(z) in response to step (n) and step (q), establishing that the second phone line is no longer on hold;

(aa) in response to step (o) and step (d), establishing that the first phone line is on-hook;

(bb) in response to step (o) and step (e), establishing that the second phone line is no longer on hold;

(cc) in response to step (o) and step (q), establishing that the first phone line is on hold;

(dd) in response to step (p) and step (d), establishing that the first phone line is no longer on hold;

(ee) in response to step (p) and step (e), establishing that the second phone line is no longer on hold; and (ff) in response to step (p) and step (f), establishing that the first phone line and the second phone line are no longer on hold.

24. A method of operating a multi-line telephone apparatus, the multi-line telephone apparatus providing for communication over at least a first phone line and a second phone line, the method comprising the steps of:

(a) detecting a condition where the first phone line and the second phone line are on-hook;

(b) detecting a condition where the first phone line is off-hook and the second phone line is on-hook;

(c) detecting a condition where the first phone line is on-hook and the second phone line is off-hook;

(d) detecting a condition where the first phone line is off-hook and on hold, and the second phone line is on-hook;

(e) detecting a condition where the first phone line is off-hook and an hold, and the second phone line is off-hook;

(f) detecting a condition where the second phone line is off-hook and on hold, and the first phone line is on-hook;

(g) detecting a condition where the second phone line is off-hook and on hold, and the first phone line is off-hook;

(h) detecting a condition where the first phone line and the second phone line are off-hook and on hold;

(i) detecting a condition where the first phone line and the second phone line are off-hook;

(j) detecting an actuation of a first phone line switch in the multi-line telephone apparatus;

(k) detecting an actuation of a second phone line switch in the multi-line telephone apparatus;

(l) detecting an actuation of a hold switch in the multi-line telephone apparatus;

(m) detecting an actuation of a conference switch in the multi-line telephone apparatus;

(n) in response to step (a) and step (j), establishing that the first phone line is off-hook;

(o) in response to step (a) and step (k), establishing that the second phone line is off-hook;

(p) in response to step (b) and step (j), establishing that the first phone line is on-hook;

(q) in response to step (b) and step (k), establishing that the first phone line is on-hook and the second phone line is off-hook;

(r) in response to step (b) and step (l), establishing that the first phone line is on hold;

(s) in response to step (b) and step (m), establishing that the second phone line is off-hook;

(t) in response to step (c) and step (j), establishing that the first phone line is off-hook and the second phone line is on-hook;

(u) in response to step (c) and step (k), establishing that the second phone line is on-hook;

(v) in response to step (c) and step (l), establishing that the second phone line is on hold;

(w) in response to step (c) and step (m), establishing that the first phone line is off-hook;

(x) in response to step (d) and step (j), establishing that the first phone line is no longer on hold;

(y) in response to step (d) and step (k), establishing that the second phone line is off-hook;

(z) in response to step (d) and step (l), establishing that the first phone line is no longer on hold;

(aa) in response to step (d) and step (m), establishing that the first phone line is no longer on hold and the second phone line is off-hook;

(bb) in response to step (e) and step (j), establishing that the first phone line is no longer on hold;

(cc) in response to step (e) and step (k), establishing that the second phone line is on-hook;

(dd) in response to step (e) and step (l), establishing that the second phone line is on hold;

(ee) in response to step (e) and step (m), establishing that the first phone line is no longer on hold;

(ff) in response to step (f) and step (j), establishing that the first phone line is off-hook;

(gg) in response to step (f) and step (k), establishing that the second phone line is no longer on hold;

(hh) in response to step (f) and step (l), establishing that the second phone line is no longer on hold;

(ii) in response to step (f) and step (m), establishing that the first phone line is off-hook and the second phone line is no longer on hold;

(jj) in response to step (g) and step (j), establishing that the first phone line is on-hook;

(kk) in response to step (g) and step (k), establishing that the second phone line is no longer on hold;

(ll) in response to step (g) and step (l), establishing that the first phone line is on hold;

(mm) in response to step (g) and step (m), establishing that the second phone line is no longer on hold;

(nn) in response to step (h) and step (j), establishing that the first phone line is no longer on hold;

(oo) in response to step (h) and step (k), establishing that the second phone line is no longer on hold;

(pp) in response to step (h) and step (l), establishing that the first phone line and the second phone line are no longer on hold;

(qq) in response to step (h) and step (m), establishing that the first phone line and the second phone line are no longer on hold;

(rr) in response to step (i) and step (j), establishing that the second phone line is on-hook;

(ss) in response to step (i) and step (k), establishing that the first phone line is on-hook;

(tt) in response to step (i) and step (l), establishing that the first phone line and the second phone line are on hold; and (uu) in response to step (i) and step (m), establishing that the first phone line and the second phone line are on hold.

25. The method according to claim 24, wherein step (i) includes detecting a conference call connection that includes the first phone line and the second phone line.

26. The method according to claim 24, wherein step (s), step (w), step (aa), step (bb), step (ee), step (ii), step (kk), step (mm), step (pp), and step (qq) each include the step of establishing a conference call connection that includes the first phone line and the second phone line.

27. The method according to claim 24, further comprising the step of:

(vv) in response to step (a) and step (m), establishing that the first phone line and the second phone line are off-hook.

28. A method of controlling operation of a telephone apparatus, the telephone apparatus providing for communication on a first line and a second line, the telephone apparatus including a first key and a second key, the method comprising the steps of:

when the first and the second lines are not in use for communication,
  in response to an actuation of the first key, controlling the telephone apparatus so that the first line is enabled for communication use;
  in response to an actuation of the second key, controlling the telephone apparatus so that the second line is enabled for the communication use;

when the first line is in use for communication and the second line is not in use for communication,
  in response to an actuation of the first key, controlling the telephone apparatus so that the first line is disabled from the communication use;
  in response to an actuation of the second key, controlling the telephone apparatus so that the first line is disabled from the communication use and the second line is enabled for the communication use;

when the first line is not in use for communication and the second line is in use for communication,
  in response to an actuation of the first key, controlling the telephone apparatus so that the first line is enabled for the communication use and the second line is disabled from the communication use; and
  in response to an actuation of the second key, controlling the telephone apparatus so that the second line is disabled from the communication use.

* * * * *